United States Patent [19]
Volk

[11] Patent Number: 6,087,816
[45] Date of Patent: Jul. 11, 2000

[54] STEP-UP/STEP-DOWN SWITCHING REGULATORS AND PULSE WIDTH MODULATION CONTROL THEREFOR

[75] Inventor: Karl Richard Volk, Scotts Valley, Calif.

[73] Assignee: Maxim Integrated Products, Inc., Sunnyvale, Calif.

[21] Appl. No.: 09/342,323

[22] Filed: Jun. 29, 1999

[51] Int. Cl.$^7$ ................................. G05F 1/56; G05F 1/10
[52] U.S. Cl. ............................................ 323/282; 323/222
[58] Field of Search ..................................... 323/220, 222, 323/268, 271, 282, 283

[56] References Cited

U.S. PATENT DOCUMENTS

| | | | |
|---|---|---|---|
| 4,347,474 | 8/1982 | Brooks et al. | 323/224 |
| 4,395,675 | 7/1983 | Toumani . | |
| 4,578,630 | 3/1986 | Grosch . | |
| 5,109,186 | 4/1992 | Lieu | 323/282 |
| 5,350,997 | 9/1994 | Ghotbi et al. | 323/222 |
| 5,402,060 | 3/1995 | Erisman . | |
| 5,528,125 | 6/1996 | Marshall et al. . | |
| 5,831,418 | 11/1998 | Kitagawa | 323/222 |
| 5,949,224 | 9/1999 | Barkarö . | |

OTHER PUBLICATIONS

Pressman, Abraham I., "Switching Power Supply Design", 1991, pp. 143–165 and 208–209.

*Primary Examiner*—Matthew Nguyen
*Attorney, Agent, or Firm*—Blakely, Sokoloff, Taylor & Zafman LLP

[57] ABSTRACT

Step-up/step-down switching regulators and pulse width modulation control therefor which can provide a high output current, high efficiency, use physically smaller inductor and transistors, have lower output voltage ripple, excellent line and load regulation stability and very fast transient response. The modulation control includes three operating states. The improved operating characteristics are obtained by including, as one of the operating states, the direct flow of current from the input of the regulator to the output of the regulator. This allows delivery of current from the inductor to the output a greater percentage of the time than in the prior art. An exemplary embodiment and exemplary method of operation are described.

9 Claims, 4 Drawing Sheets

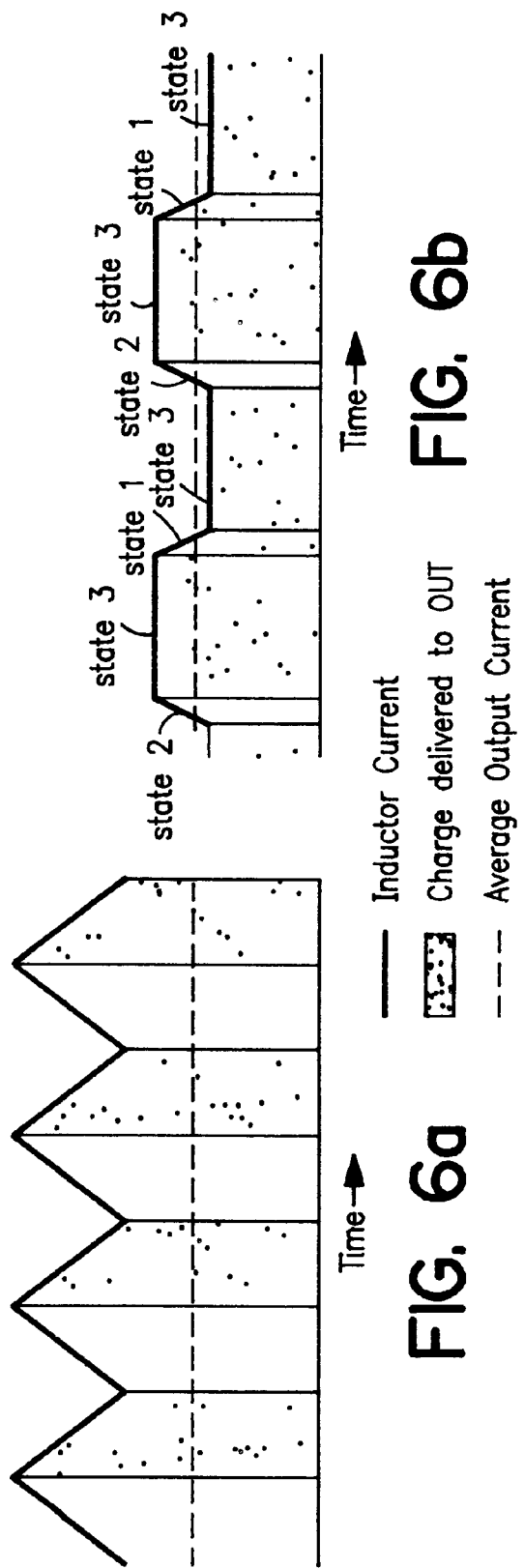

STEP-UP/STEP-DOWN SWITCHING REGULATORS AND PULSE WIDTH MODULATION CONTROL THEREFOR

BACKGROUND OF THE INVENTION

1. Field of the Invention

The present invention relates to the yield of switching regulators.

2. Prior Art

Voltage regulators of various types are well known in the prior art. Of particular importance to the present invention are switching regulators which allow the regulators to provide a regulator output of a voltage which can be either higher or lower than the input voltage, as desired or as required for a particular application. One application for such regulators is with respect to systems operating on rechargeable batteries such as, by way of example, lap top computers. In this application, a charged battery may provide an input voltage to the regulator exceeding the desired regulated output voltage thereof, though with the battery voltage sagging to a voltage below the desired output voltage of the regulator as the battery discharges. The time between recharges necessary in such an application may be extended if the system will operate on a significantly reduced battery output voltage until such time as the battery is nearly fully discharged. The time between recharges can also be extended if the efficiency of the regulator in such a system is improved and, of course, the size of various components of the regulator, such as the inductor, can be decreased with such increased efficiency because of the proportionately lower power dissipation in the regulator. Similarly, battery powered systems such as laptop computers may be operable with different types of batteries or battery packs having different output voltages, some requiring step-up and some step-down in the battery voltage to provide the desired regulated voltage for system operation. Also such systems are often operable on a battery pack or an AC-to-DC converter, the two frequently having significantly different voltages to present to the regulator. These are merely exemplary of the many applications in which this type of regulator is useful, if not mandatory.

Prior art switching regulators having the capability of both step-up and step-down are SEPIC (single-ended primary inductance converter), Flyback, Step-up plus LDO (low dropout linear regulator), or are sometimes comprised of the basic circuit shown in FIG. 1. As shown therein, an inductor L is coupled to the input voltage $V_{in}$ through a p-type MOS transistor PFET, and is coupled to the output voltage through diode D2. Capacitors C1 and C2 provide smoothing on the input $V_{in}$ and the output $V_{out}$, respectively, with NMOS transistor NFET controllably coupling node LX2 to ground. In operation, transistors PFET and NFET act as switches, with the controller controlling the switches turning both transistors on or both transistors off at the same time. In particular, when both transistors PFET and NFET are turned on, current in the inductor L will build up at the rate $$\frac{di}{dt} = \frac{V_{in}}{L}.$$

During this time, diode D1 will be back biased, as will diode D2 if there is any output voltage $V_{out}$, or at least on initial start-up will not be forward biased. Thus during this time, current flow is through the PFET transistor, inductor L and the NFET transistor to ground, with some i²R loss occurring in the inductor L and transistors even though no current is being delivered to the output of the regulator. When both transistors PFET and NFET are turned off, the magnetic field of the inductor L decays, forward biasing diodes D1 and D2 and providing a current to the regulator output initially equal to the current through the inductor when the transistors were first turned off, and decreasing at the rate:

$$\frac{di}{dt} = -\frac{V_{out} + 2V_D}{L}$$

where $V_D$ is the voltage drop of each diodes D1 and D2 when forward biased to conduction.

To minimize the forward conduction diode voltage drops of diodes D1 and D2, Schottky diodes may be used.

It may be seen from the foregoing description that current is flowing in the inductor L in both modes of operation, even though the current in the inductor is only flowing to the output of the regulator during the second mode of operation. Thus, there is a significant i²R loss in the inductor during both modes of operation, even though current is delivered to the output only during the second mode. By way of a specific example, if the regulator is operated so that the output voltage equals the input voltage minus $2V_D$, the current through the inductor L will have a triangular waveform, with as much i²R loss in the rising part of the waveform as in the decreasing part of the waveform, even though current is delivered to the output only during that decreasing part. This power dissipation can be kept down by making the inductor and transistors physically larger, though this is undesirable from a cost standpoint, and not consistent with the trend toward further miniaturization and complexity of electronic systems.

Due in part to complexity and efficiency issues, prior art step-up/step-down regulators of the foregoing type have not yet been implemented in monolithic integrated circuit form, but have been produced using discrete circuits.

BRIEF SUMMARY OF THE INVENTION

Step-up/step-down switching regulators and pulse width modulation control therefor which can provide a high output current, high efficiency, use a physically smaller inductor and physically smaller transistors, have lower output voltage ripple, excellent line and load regulation stability and very fast transient response. The modulation control includes three operating states. The improved operating characteristics are obtained by including, as one of the operating states, the direct flow of current from the input of the regulator to the output of the regulator. This allows delivery of current from the inductor to the output a greater percentage of the time than in the prior art.

An exemplary embodiment and exemplary method of operation are described.

BRIEF DESCRIPTION OF THE DRAWINGS

FIG. 6a illustrates the inductor current versus time for a prior art step-up/step-down switching voltage regulator.

FIG. 6b illustrates the inductor current waveform for the step-up/step-down converters of the present invention when operating under the same assumed conditions as for the prior art of FIG. 6a.

DETAILED DESCRIPTION OF THE PREFERRED EMBODIMENT

Figure 1:
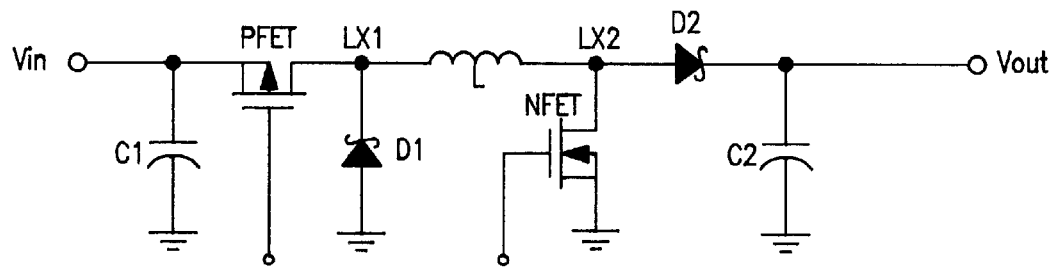
FIG. 1 is a prior art circuit for switching regulators having the capability of both step-up and step-down operation.
Figure 2:
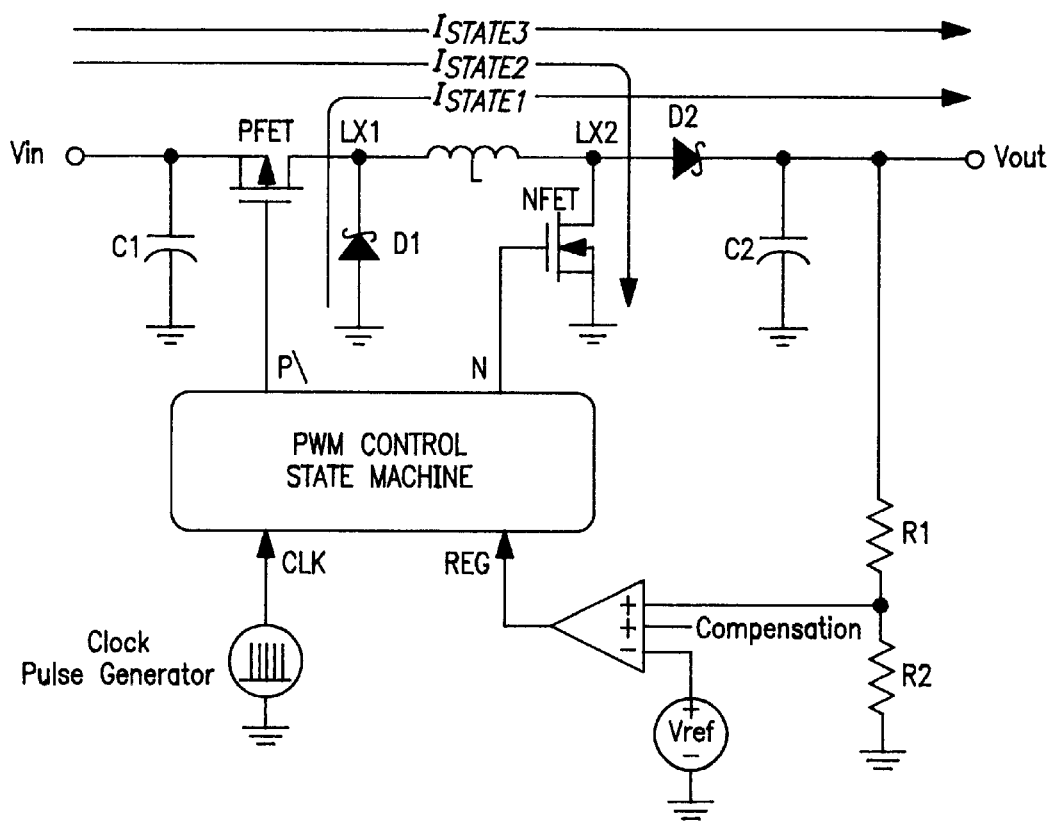
FIG. 2 is a diagram illustrating an exemplary step-up/step-down switching regulator system in accordance with the present invention.

Now referring to FIG. 2, a diagram illustrating an exemplary system in accordance with the present invention may be seen. In this circuit, the transistors PFET and NFET, inductor L, diodes D1 and D2 and capacitors C1 and C2 are connected the same way as in the prior art circuit of FIG. 1. However, as shall subsequently be seen, the inductor L and transistors PFET and NFET of FIG. 2 may be smaller and/or result in lower power dissipation than in FIG. 1 because of the reduced currents using the improved method of operation thereof. In particular, the pulse width modulation (PWM) control state machine controls the FFET and the NFET transistors in a manner providing improved performance and efficiency of the overall converter.

As may be seen in FIG. 2, the PWM control state machine of the exemplary embodiment has two inputs, one a clock input CLK from a clock pulse generator, and a signal REG indicating whether the output signal Nout is above or below regulation. In that regard, the regulation signal REG is provided by the output of a comparator COMP which compares some fraction of the output voltage $V_{out}$, determined by the voltage divider comprised of resistors R1 and R2, with a reference voltage $V_{ref}$. Since the converter, in part, operates like a boost converter, and therefore requires compensation for stability, the input to the comparator COMP includes a compensation signal, which may be of the general type characteristic of prior art boost converters such as, by way of example, slope compensation or current mode feedback. Such compensation is well known, being described in detail in various publications (see for instance, "Switching Power Supply Design", Abraham I. Pressman, McGraw-Hill, Inc., 1991, pgs. 143–165, 208–209, incorporated herein by reference) and used in numerous prior art converters. For the present purposes, the signal REG should be recognized as a compensated signal, indicative of the regulator being above or below regulation, not merely a direct comparison of a fraction of the regulator output voltage with a reference voltage.

Figure 3:
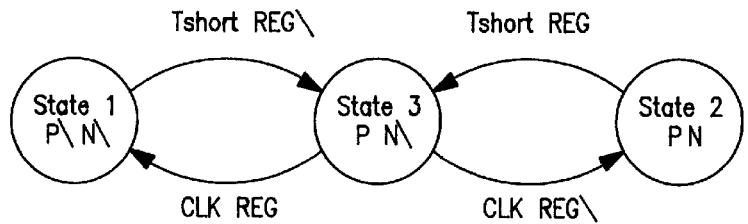
FIG. 3 is a state diagram for the exemplary PWM control state machine of FIG. 2.

Now referring to FIG. 3, a state diagram for the exemplary PWM control state machine of FIG. 2 may be seen. As shown therein, the state machine has three states, with transitions being possible between states 1 and 3, and states 2 and 3, but not directly between states 1 and 2. In state one, both transistors are off. In this case, only the current $I_{state1}$ shown in FIG. 2 is allowed, allowing current flow through diode D1, inductor L and diode D2 to the output of the regulator as the energy stored in the inductor decays, though the current $I_{state1}$ may at times be zero, but not negative because of the presence of the diodes. State 2 is a state with both transistors turned on, providing current flow from the input $V_{in}$ through the PFET transistor, inductor L and the NFET transistor to ground. This is a state wherein current is provided from the power supply to the inductor, but none of that current is then being provided to the output. Finally, in state 3, the PFET transistor is on and the NFET transistor is off. In this state, a current $I_{state3}$ may be provided from the power supply through the PFET transistor, inductor L and diode D2 to the output. In state 3, like state 1, the current $I_{state3}$ may in fact be zero, though not negative because of the blocking effect of diode D2.

Figure 4:
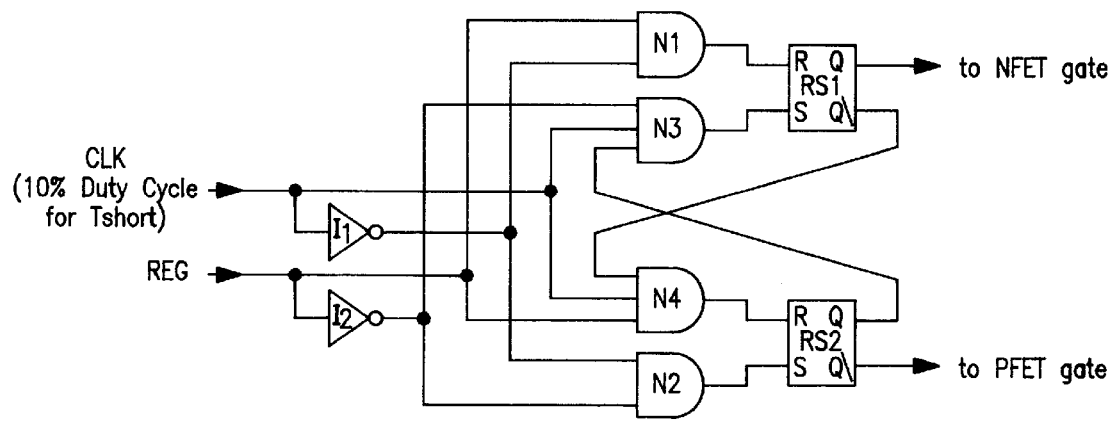
FIG. 4 is a logic circuit diagram for one possible circuit implementation of an exemplary embodiment of the present invention.

Now referring to FIG. 4, a logic circuit diagram for one possible circuit implementation of an exemplary embodiment of the present invention may be seen. This circuit, comprised of inverters $I_1$ and $I_2$, two input NAND gates N1 and N2, three input NAND gates N3 and N4, and RS flip-flops RS1 and RS2, is responsive to the signal REG, representing the state of regulation of the output (high for above regulation and low for below regulation), and a clock CLK input. As shall subsequently be described in greater detail, the clock input CLK of the preferred embodiment has a duty cycle of approximately 10%, with the clock pulse duration being referred to herein for specificity as Tshort The operation of the logic circuit of FIG. 4 may be described with respect to the state machine diagram of FIG. 3 and the following state-time table:

State-Time Table

| State | CLK | REG | N | P | Time in this condition |
|---|---|---|---|---|---|
| 3 | lo | hi | off | on | Until next CLK |
| 1 | hi | hi | off | off | Tshort (clock pulse width) |
| 1 | lo | hi | off | off | Until REG goes lo |
| 3 | lo | lo | off | on | Until next CLK |
| 2 | hi | lo | on | on | Tshort (clock pulse width) |
| 2 | lo | lo | on | on | Until REG goes hi |
| 3 again | lo | hi | off | on | Until next CLK |

In the logic circuit diagram of FIG. 4, the two outputs of the circuit are the output signals to the gate of the NFET and to the gate of the PFET. As a starting point in describing the operation of the circuit, it will be presumed that the circuit is in state 3. In that regard, it may be seen from the above table that in state 3, the clock signal CLK is low, though the regulation signal REG may be either high or low. In any event, for purposes of specificity, it will be assumed that the regulation signal REG is above regulation. This, of course, means that the inductor is supplying too much current to the load. The logic circuit will remain in state 3, however, until the clock CLK goes high. In that regard, in an exemplary embodiment, clock pulses occur at approximately every 2 microseconds (500 KHz). As shall subsequently be seen, state 3, assumed as a starting state for the present description, may have been entered from state 1 or state 2 at any time during that 2 microsecond period, so that the length of time that the circuit may have been in state 3 will vary, but in the exemplary embodiment will not exceed 2 microseconds.

On the next clock pulse CLK, the output signal to the gate of the NFET will be low and the output signal to the gate of the PFET will be high. Thus, both transistors are turned off, representing state 1, the clock pulse itself triggering the transition having a pulse width in the exemplary embodiment of approximately 200 nanoseconds, or a 10% duty cycle. Thereafter, the clock signal CLK will go low. Assuming that the regulation signal REG will momentarily remain high, both the NFET and the PFET will remain off until the regulation signal REG, in fact, goes low. When this occurs, as may be seen in Table 1, the circuit returns to state 3, with the NFET off and the PFET on, remaining there in the exemplary embodiment for no more than 2 microseconds, until the next clock pulse CLK is received. When the next clock pulse CLK is received, REG may be high or low, but for purposes of specificity, it will be assumed that the regulation signal REG is below regulation. The low state of the regulation signal REG will result in both the NFET and the PFET transistor being turned on, putting the controller into state 2. The controller will remain in state 2, even after the clock pulse CLK goes low, until the regulation signal REG goes high again, putting the circuit back into the beginning state 3 condition. In essence, states 1 and 3 form a leading edge modulated step-down converter, while states 2 and 3 form a lagging edge modulated step-up converter.

Figure 5:
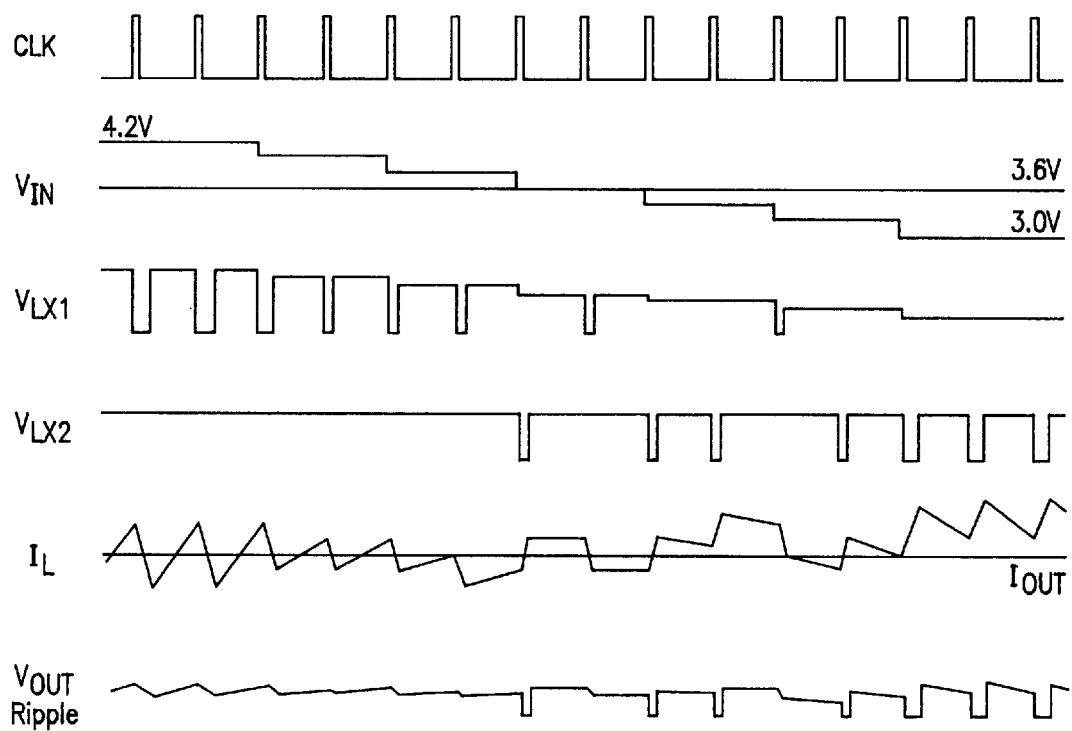
FIG. 5 shows typical waveforms for the exemplary embodiment of FIG. 2 as the input voltage $V_{in}$ transitions from greater than $V_{out}$ to less than $V_{out}$.

FIG. 5 shows typical waveforms for the exemplary embodiment of FIG. 2 as the input voltage $V_{in}$ transitions from greater than $V_{out}$ to less than $V_{out}$. The first line of the Figure illustrates the clock signal, showing the approximate 10% duty cycle thereof. The second line shows a decreasing input signal $V_{in}$, changing from an initial 4.2 volts to a final 3 volts, with a desired regulated output voltage of 3.6 volts. The remaining lines illustrate voltages at nodes LX1 and LX2, the inductor current $I_L$, and the output ripple $V_{out}$ RIPPLE. The waveforms shown assume a constant load on the regulator $I_{out}$.

When the input voltage $V_{in}$ exceeds the regulator output voltage $V_{out}$, as in the left side of FIG. 5, the circuit of FIG. 2 will alternate between states 1 and 3. Thus, the NFET transistor will stay off and the voltage $V_{LX2}$ at node LX2 will remain substantially constant, namely, at a voltage equal to $V_{out}$ plus the forward conduction voltage drop across diode D2. The voltage at $V_{LX1}$ at node LX1, however, will switch at each clock cycle to state 1 with the PFET transistor off, the PFET transistor remaining off for a length of time which will be dependent upon the extent to which $V_{in}$ exceeds the output voltage $V_{out}$. In that regard, it can be seen from the waveform of the voltage $V_{LX1}$ of FIG. 5 that the length of time the PFET transistor remains off decreases as the input voltage decreases, ultimately having a minimum time off equal to $T_{short}$, the time period of the clock signal CLK.

At the right side of FIG. 5, the input voltage $V_{in}$ has decreased to significantly below the output voltage $V_{out}$. Under these conditions, the circuit of FIG. 2 will switch to state 2 on each clock cycle, remaining there for a period of time dependent upon how far the input voltage $V_{in}$ is below the output voltage $V_{out}$. Under these conditions, the PFET transistor remains on, as indicated by the waveform for the voltage $V_{LX1}$, showing that the voltage at node LX1 follows the input voltage $V_{in}$. The voltage $V_{LX2}$ at node LX2 shows the increasing duration of the NFET transistor being on for lower input voltages.

Finally, when the input voltage $V_{in}$ is approximately equal to the output voltage $V_{out}$, the state machine may intermix switching between states 3 and 1 and back to state 3, and switching between state 3 and state 2 and back to state 3. In that regard, it will be noted that in the center of FIG. 5, when the input voltage $V_{in}$ is approximately equal to the output voltage $V_{out}$, the voltage $V_{LX2}$ at node LX2 is shown as going low for one clock duration ($T_{short}$), indicating that the NFET transistor is turned on for the clock duration for state 2, after which the circuit returns to state 3. On the next clock cycle, the voltage $V_{LX1}$ at node LX1 goes low for the clock duration (for duration $T_{short}$ again), indicating that the circuit has gone to state 1 for the clock duration ($T_{short}$ again), returning to state 3, to then go to state 2 again on the next clock cycle. Thus, under these conditions, the circuit remains in state 1 or state 2 for the minimum time for this embodiment, namely $T_{short}$, and cycles between states 3 and 2 and states 3 and 1 as required to maintain the output in regulation.

Now referring to FIGS. 6a and 6b, the advantage of the present invention is graphically illustrated. FIG. 6a illustrates the inductor current versus time for a prior art step-up/step-down switching voltage regulator as previously described, when operating with an input voltage $V_{in}$ approximately equal to the output voltage $V_{out}$, the specific illustration being for an input voltage $V_{in}$ equal to the output voltage $V_{out}$ plus the sum of the forward conduction diode voltage drops $V_D$ of diodes D1 and D2. During the first half of each cycle, wherein both the NFET and PFET transistors (see FIG. 1) are turned on, the current in the inductor linearly increases at the rate the $$\frac{di}{dt} = \frac{V_{in}}{L},$$

with none of the inductor current being delivered to the output. On the second half cycle, with both the PFET transistor and the NFET transistor turned off, inductor current is delivered to the output $V_{out}$, with the current in the inductor decreasing at the rate $$\frac{di}{dt} = -\frac{(V_{out} + 2V_D)}{L}.$$

For the assumed operating conditions, the inductor current waveform is symmetrical, though that inductor current is delivered to the output only 50% of the time.

FIG. 6b illustrates the corresponding inductor current waveform for the step-up/step-down converters of the present invention when operating under the same assumed conditions as for the prior art of FIG. 6a. In FIG. 6b, it is assumed that initially, the circuit is in state 3, with the current in the inductor being somewhat below the output load current. By the next clock cycle, because of the inductor current having been lower than the output load current, the output voltage $V_{out}$ would have fallen to below regulation. Therefore on the next clock cycle, the circuit will enter state 2, wherein the current in the inductor will rapidly increase at the rate $$\frac{di}{dt} = \frac{V_{in}}{L}.$$

By the end of the clock cycle, the inductor current will have risen to a value above the output load current, so that the output voltage sill drift above regulation by the time of the next clock cycle. Thus, on the next clock cycle, the circuit will enter state 1, wherein the current in the inductor decreases at the rate $$\frac{di}{dt} = -\frac{(V_{out} + 2V_D)}{L},$$

after which clock pulse the circuit enters state 3 again with an inductor current again below the output load current. The circuit may insert slightly more state 1 pulses than state 2 pulses or slightly more state 2 pulses than state 1 pulses, depending on the specific input voltage level as needed to maintain the output in regulation. Still, even if the circuit was approximately in state 2 as often as in state 1, note that given the 10% duty cycle of the clock, current flowing through the inductor is flowing to the output approximately 95% of the time, instead of 50% as in FIG. 6a. Further, the inductor current stays reasonably close to the average output current (i.e., it is substantially free of wide excursions). Consequently, in FIG. 6b, illustrating the present invention, the average inductor current is only slightly more than the average output current, and the instantaneous inductor current does not vary much from the average inductor current. In FIG. 6a, however, the average inductor current is twice the average output current, and varies in time much more than for the present invention. Consequently, the i²R losses in the inductor, transistors and diodes of FIG. 6a are on the order of four times the losses that would occur in the same components delivering the same load current utilizing the present invention operation. Further, because the peak inductor currents are more than twice as large for the conventional operation of FIG. 6a than in the system of the present invention, either much larger inductors are required using the prior art methods or, alternatively, the average output current which may be provided will be only approximately one-half that of the present invention before saturation of the inductor or the maximum current allowed in the switches occurs.

In addition, the reduction in the peak currents through the PFET transistor by approximately 50% in favor of a higher duty cycle in the conduction of the PFET transistor (see FIGS. 6a and 6b and the foregoing explanation thereof) reduces the power dissipation (i²R loss) in the PFET transistor by approximately 50%. The NFET transistor, as used in the prior art, had the same current as the PFET transistor, and accordingly a similar power dissipation. In the present invention, as may be seen in FIG. 6b, the NFET in the exemplary embodiment and in the exemplary use will conduct only about 5% of the time, and then a current only approximately one half that of the prior art. Thus the power dissipation in the NFET transistor is grossly reduced, allowing the use of a much smaller transistor. These reduced power dissipations in the transistor switches makes the present invention practical to realize in integrated circuit form.

The various advantages of the present invention in comparison to the conventional operation of step-up/step-down converters may be summarized at least in part by noting that the present invention allows for higher output current. More specifically, for given switching transistors and inductor current rating, the output current is improved by a factor of 2. This is because the current is delivered to the output nearly all of the time, versus half of the time for the prior art, so that the peak inductor current is only slightly higher than the average output current in the present invention, whereas the peak currents in the prior art are over twice the average output current. The present invention also provides for higher operating efficiency due to the substantially reduced i²R losses in the inductor. The reduction of average inductor current by approximately 50% reduces the i²R losses by approximately 75% for a specific inductor. Further, there are lower switching transistor drive losses because the invention transitions the gate of only one switching transistor during each cycle, versus transitioning the gates of both switching transistors for each clock cycle for conventional step-up/step-down converters. The invention also favors a lower inductance of the inductor for steep inductor current slopes in states 1 and 2 (see FIG. 6b). This, coupled with the fact that the inductor may also have a lower current rating before saturation because of the reduction of peak currents therein, physically smaller inductors may be used, such as inductors of one-fourth the size characteristic of the prior art. Because the present invention provides a much smoother output current, the output ripple is approximately halved, or of course, alternatively, the size of the output filter capacitor C2 characteristically used may be made much smaller for the same ripple. The reduction of the power dissipation in the transistor switches makes it practical to build the circuit in integrated circuit form.

The present invention provides excellent line and load regulation and stability. In particular, the compensation signal (FIG. 2) need only be minimal since step-down operation is leading edge modulated, which is inherently stable from 50% to 100% pulse width modulation duty cycles, and step-up operation is lagging edge modulated, easily stabilized from 0% to 50% pulse width modulated duty cycles. This provides optimal stability from $V_{out}/2 < V_{in} < 2V_{out}$, the most likely operating conditions for a step-up/step-down DC-to-DC converter to be used. A smaller compensation signal usually results in improved line and load regulation. Additionally, the feedback amplifier is ideally a comparator with infinite gain and zero hysteresis, also resulting in improved regulation. Finally, the present invention provides very fast transient response. Due to the lower inductance of the inductor, the inductor current can be ramped more than twice as quickly. Additionally, the invention allows even faster ramping of inductor current. In step-down operation with a sudden increase in load, the state machine will insert a single step-up cycle to very rapidly increase inductor current within one cycle. In step-up operation with a sudden decrease in load, the state machine will insert a single step-down cycle to very rapidly decrease inductor current within one cycle. These two types of transients are where the conventional step-up/step-down converter operation has the slowest response. The result is that the present invention can modulate inductor current to any level within just one clock cycle.

A preferred embodiment has been disclosed herein having a negative common between input and output, and using YOS transistors for the switching transistors. This embodiment is exemplary only, as the circuit may readily be reversed in transistor conductivity types and diode directions to provide a circuit having a positive common, useful for such purposes as providing a step-up/step-down regulator for negative voltages. Similarly, transistors of other types may be used in place of the MOS transistors, such as npn and pnp bipolar junction transistors. Further, while diodes D1 and D2, preferably Schottky diodes, are shown as rectifying devices in FIG. 2, other types of rectifying devices may be used, such as synchronous switches and the like.

Thus, while the present invention has been disclosed and described herein with respect to preferred embodiments thereof, it will be understood by those skilled in the art that various changes in form and detail may be made therein without departing from the spirit and scope thereof.

What is claimed is:

1. A converter for step-up and step-down operation having a converter input, a converter output and a common connection, comprising:

an inductor having first and second connections;

a first transistor coupled between the converter input and the first inductor connection;

a first rectifying device coupled between the first inductor connection and the common connection;

a second transistor coupled between the second inductor connection and the common connection;

a second rectifying device coupled between the second inductor connection and the converter output;

a controller controlling the state of conduction of the first and second transistors responsive to a compensated converter output and a clock signal, the controller having three states of operation, a first state turning the first and second transistors off, a second state turning the first and second transistors on, and a third state turning the first transistor on and second transistor off, the controller switching from the third state to the first state on clock pulses occurring when the compensated converter output indicates an over regulation condition and switching back to the third state when the compensated converter output changes to indicate an under regulation condition, and the controller switching from the third state to the second state on clock pulses occurring when the compensated converter output indicates an under regulation condition and switching back to the third state when the compensated converter output changes to indicate an over regulation condition.

2. The converter of claim 1 wherein the controller is comprised of logic gates and inverters.

3. The converter of claim 1 wherein the controller, when switched into the first or the second state, maintains the respective state for at least a minimum period of time, irrespective of any change in the compensated converter output during that minimum period of time.

4. The converter of claim 3 wherein the minimum period of time is substantially equal to the period of the clock pulse.

5. The converter of claim 4 wherein the clock signal has a duty cycle of approximately 10 percent.

6. A method of operating a converter having a converter input, a converter output and a common connection, the converter also having an inductor having first and second connections, a first transistor coupled between the converter input and the first inductor connection, a first rectifying device coupled between the first inductor connection and the common connection, a second transistor coupled between the second inductor connection and the common connection and a second rectifying device coupled between the second inductor connection and the converter output, comprising:

controlling the state of conduction of the first and second transistors responsive to a compensated converter output and a clock signal by:

a) switching the first and second transistors off on clock pulses occurring when the compensated converter output indicates an over regulation condition and then switching the first transistor on when the compensated converter output changes to indicate an under regulation condition; and, b) switching the first and second transistors on clock pulses occurring when the compensated converter output indicates an under regulation condition and switching the second transistor off when the compensated converter output changes to indicate an over regulation condition.

7. The method of claim 6 wherein in subparagraph a), the first and second transistors are both switched off for at least a minimum period of time, and in subparagraph b), the first and second transistors are both switched on for at least a minimum period of time, all irrespective of any change in the compensated converter output during that minimum period of time.

8. The converter of claim 7 wherein the minimum period of time is substantially equal to the period of the clock pulses.

9. The converter of claim 8 wherein the clock signal has a duty cycle of approximately 10 percent.

* * * * *

UNITED STATES PATENT AND TRADEMARK OFFICE
CERTIFICATE OF CORRECTION

PATENT NO. : 6,087,816
DATED : July 11, 2000
INVENTOR(S) : Volk

Page 1 of 1

It is certified that error appears in the above-identified patent and that said Letters Patent is hereby corrected as shown below:

Column 3,
Line 24, delete "FFET" and insert -- PFET --.

Column 4,
Line 9, delete "NAND" and insert -- AND --.
Line 10, delete "NAND" and insert -- AND --.

Column 8,
Line 35, delete "YOS" and insert -- MOS --.

Signed and Sealed this

Twenty-fifth Day of December, 2001

Attest:

Attesting Officer

JAMES E. ROGAN
*Director of the United States Patent and Trademark Office*